United States Patent [19]

Mishima et al.

[11] Patent Number: 5,168,668
[45] Date of Patent: Dec. 8, 1992

[54] STRUCTURE FOR ATTACHING GLASS RUN

[75] Inventors: Kunio Mishima; Masahiro Nozaki; Masahiro Koide, all of Inazawa, Japan

[73] Assignee: Toyoda Gosei Co., Ltd., Aichi, Japan

[21] Appl. No.: 799,149

[22] Filed: Nov. 27, 1991

[30] Foreign Application Priority Data

Nov. 28, 1990 [JP] Japan ................................ 2-326605

[51] Int. Cl.$^5$ ............................................. E06B 7/16
[52] U.S. Cl. ........................................ 49/440; 49/490
[58] Field of Search ................. 49/490, 440, 441, 491, 49/488, 489

[56] References Cited

U.S. PATENT DOCUMENTS

| | | | |
|---|---|---|---|
| 4,370,833 | 2/1983 | Niemanns | 49/489 |
| 4,756,944 | 7/1988 | Kisanuki . | |
| 4,783,931 | 11/1988 | Kirkwood | 49/441 |
| 4,843,759 | 7/1989 | Kisanuki et al. . | |
| 4,864,774 | 9/1989 | Onishi et al. . | |
| 4,894,953 | 1/1990 | Nozaki . | |
| 4,910,919 | 3/1990 | Kisanuki et al. . | |
| 4,977,706 | 12/1990 | Kisanuki . | |
| 5,014,464 | 5/1991 | Dupuy et al. | 49/440 |
| 5,054,241 | 10/1991 | Mishima et al. . | |

FOREIGN PATENT DOCUMENTS 63-97416  4/1988  Japan .

OTHER PUBLICATIONS

English abstract of Kond et al Japanese laid open application No. 63-97416, Apr. 1988.

Primary Examiner—Philip C. Kannan
Attorney, Agent, or Firm—Cushman, Darby & Cushman

[57] ABSTRACT

A door frame and galss run assembly for a motor vehicle including a door frame, a door molding secured along an inner periphery of the door frame, and a glass run inserted in the channel portion formed by the door frame and the door molding. The glass run has a solid rubber base portion which is generally U-shaped in cross-section and is inserted into the channel portion. A projection made of sponge rubber is formed on an outer surface of an outside corner portion of the base portion with respect to the passenger compartment of the motor vehicle. When the base portion is inserted into the channel portion, the projection comes into pressing contact with an inner surface of an outside corner portion of the channel portion with respect to the passenger compartment.

7 Claims, 3 Drawing Sheets

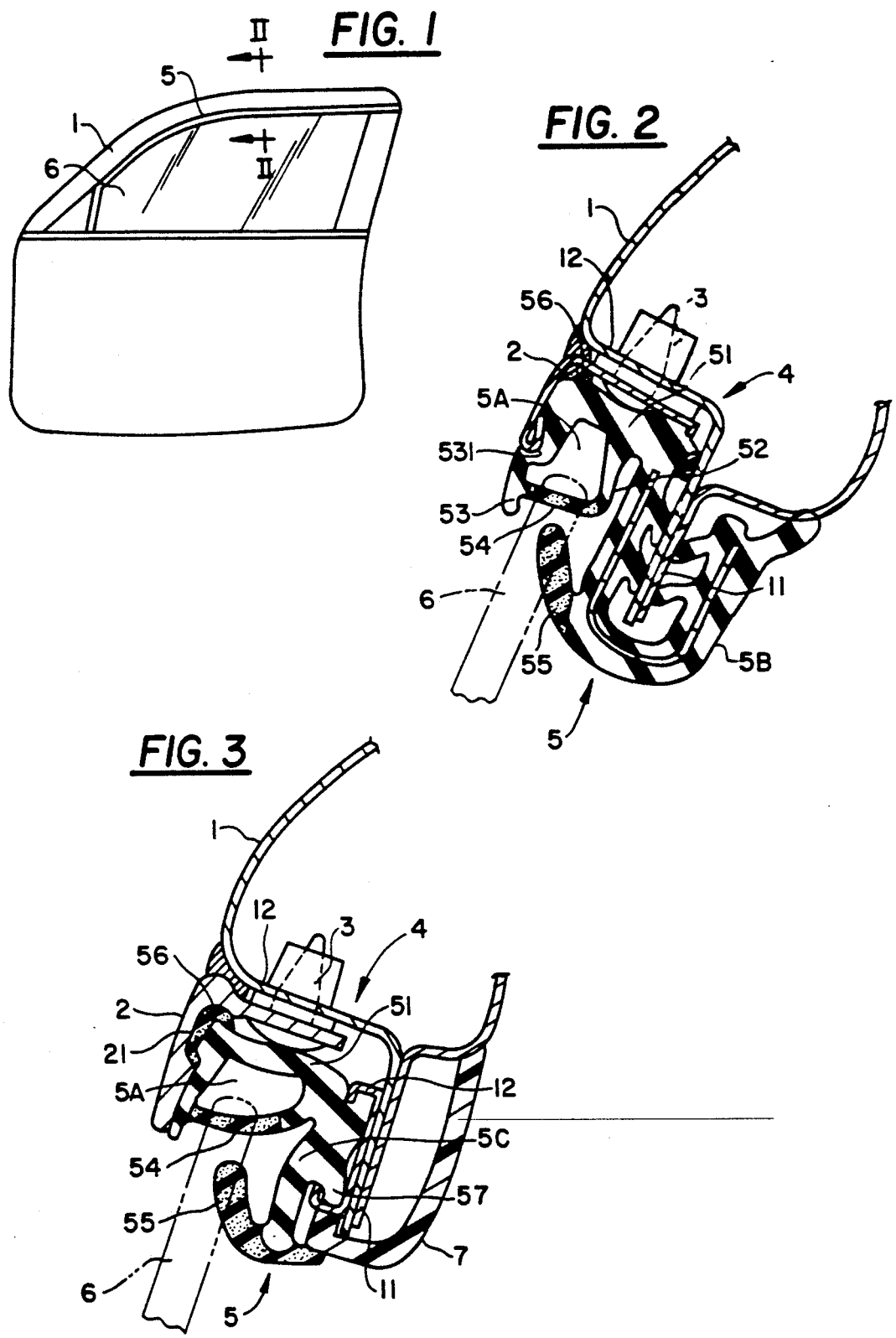

STRUCTURE FOR ATTACHING GLASS RUN

BACKGROUND OF THE INVENTION

1. Field of the Invention

The present invention relates to a structure for attaching a glass run along a door frame of a motor vehicle.

2. Description of the Related Art

In one conventional structure for attaching a glass run along a door frame of a motor vehicle, a door molding is attached along the door frame to define therewith a channel portion having a substantially U-shaped cross-section, and a glass run is inserted into that channel portion (Japanese Patent Application Laid-Open (Tokkai) No. Sho63-97416).

FIG. 6 illustrates the above-described structure for attaching glass run to door frame. In the drawing, a door molding 2 is secured to a door frame 1 by screws 3, thereby defining a channel portion 4 having a substantially U-shaped cross-section. A glass run 5 is provided which includes a tubular sealing portion 5A and a trim portion 5B which is integrally formed with the tubular sealing portion 5A. The trim portion 5B is attached to a flange 11 of the door frame 1. A base portion 51 of the tubular sealing portion 5A is inserted into the channel portion 4.

When the door glass 6 is raised to its closed position, a seal wall 54 of the tubular sealing portion 5A is pushed up by the peripheral edge of the door glass 6.

In the above-described structure, the cross-sectional shape of the channel portion 4 may vary due to inevitable variations in the position of the door molding 2 relative to the door frame 1 following attachment. As a result, the base portion 51 of the tubular sealing portion 5A may be loosely disposed in the channel portion 4 and, accordingly, the channel portion 4 may not effectively retain the base portion 51 of the tubular sealing portion 5A. Furthermore, when the motor vehicle is washed with high pressure washing water or driven in heavy rain, there is a possibility that water will leak into the passenger compartment of the motor vehicle through a resultant gap between the channel portion 4 and the base portion 51 of the tubular sealing portion 5A.

In an effort to overcome the above-described problem, a solid rubber projection 50 has been integrally formed with the base portion 51 of the tubular sealing portion 5A, as shown in FIG. 6. However the size and configuration of the projection 50 may vary due to dimensional tolerances. Accordingly, on occasion the base portion 51 cannot be easily inserted into the channel portion 4 and, occasionally, the projection 50 of the inserted base portion 51 does not sealingly abut against the inner surface of the channel portion 4, whereby water leakage into the passenger compartment of the motor vehicle cannot be effectively prevented.

SUMMARY OF THE INVENTION

It is an object of the present invention to provide a structure for attaching a glass run to a door frame, which enables the glass run to be stably retained by the door frame in close contact therewith, and which facilitates the assembly of the glass run to the door frame.

In accordance with the present invention, a door molding is attached along an inner periphery of a door frame to define a channel portion having a U-shaped cross-section with the door frame, and a glass run is mounted to the channel portion. The glass run has a base portion made of solid rubber which is inserted into the channel portion. A projection made of sponge rubber is formed on an outer surface of the base portion so as to come into pressing contact with an inner surface of the channel portion when the base portion is inserted into the channel portion.

The sponge rubber projection freely deforms in accordance with variations in the size and configuration of the gap between the base portion of the glass run and the channel portion. Accordingly, by forming the projection slightly larger than the anticipated gap, the projection accommodates variations in the size and configuration of the gap, and assures good sealing characteristics of the glass run. Moreover, the projection does not obstruct the assembly of the base portion of the glass run and the channel portion because it is formed from sponge rubber which allows it to easily deform, as noted above.

Other objects, features and characteristics of the present invention will become apparent upon consideration of the following description and the appended claims with reference to the accompanying drawings, all of which form a part of this specification.

BRIEF DESCRIPTION OF THE DRAWING

FIG. 1 is a front view of a door of a motor vehicle illustrating where a glass run in accordance with the present invention is mounted;

FIG. 2 is a cross-sectional view of a first embodiment of the glass run in accordance with the present invention, taken along the line II—II of FIG. 1;

FIG. 3 is a cross-sectional view of a second embodiment of the invention taken along the line II—II of FIG. 1;

DETAILED DESCRIPTION OF THE PRESENTLY PREFERRED EXEMPLARY EMBODIMENTS

Figure 4:
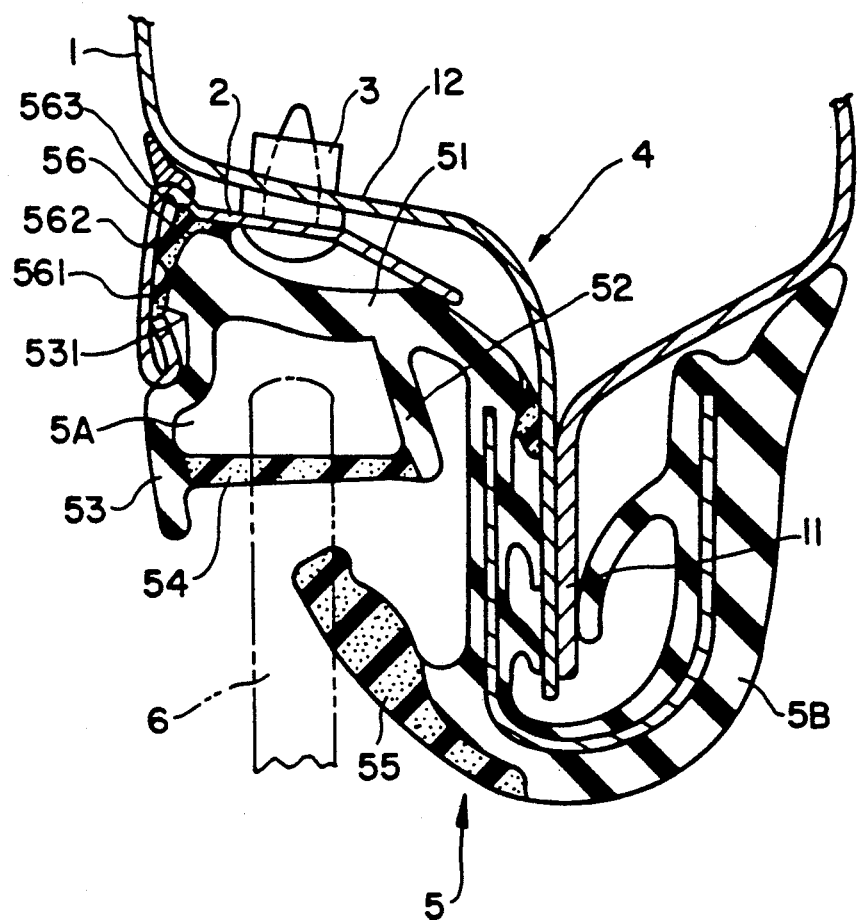
FIG. 4 is a cross-sectional view of a third embodiment of the invention taken along line II—II of FIG. 1.

As shown in FIG. 1, a glass run 5 is mounted along a door frame 1 of a motor vehicle.

FIG. 2 illustrates a first embodiment of the present invention. The inner periphery of the door frame 1 with respect to the door glass 6 has an L-shaped cross-section and is composed of a flange 11 and a flat portion 12. A metal door molding 2 having an L-shaped cross-section is secured to the flat portion 12 by screws 3 at about the center thereof in the widthwise direction. Thus, the door molding 2 and the door frame 1 define a channel portion 4 having a downwardly opening, U-shaped cross-section.

The glass run 5 is an integral extruded body made of rubber and includes a tubular sealing portion 5A having a substantially rectangular cross-section and a trim portion 5B having a U-shaped cross-section.

The glass run 5 is attached to the door frame 1 by mounting the trim portion 5B on the flange 11 of the door frame 1 and inserting the tubular sealing portion 5A into the channel portion.

The tubular sealing portion 5A is composed of a base portion 51 which has a generally U-shaped cross-section, which integrally extends from the trim portion 5B, and a seal wall 54 which connects an end of an inside wall 52 of the base portion 51 to an end of an outside wall 53 thereof. The base portion 51 is inserted into the channel portion 4.

When the door glass 6 is raised to its closed position, the seal wall 54 is pushed up by the peripheral edge of the door glass 6.

Seal lip 55 extends from an outer surface of the trim portion 5B, and an end thereof comes into contact with an inside surface of the door glass 6, with respect to the passenger compartment of the motor vehicle, when it is raised to its closed position.

The trim portion 5B and the base portion 51 of the tubular sealing portion 5A are made of solid rubber while the seal wall 54 and the seal lip 55 are made of sponge rubber.

The outside wall 53 is provided with a concave portion 531 in its outside surface, with respect to the passenger compartment of the motor vehicle, with which a folded end of the door molding 2 is engaged.

A sponge rubber projection 56 is formed on an outside corner portion of the base portion 51, which faces a corner portion of the door molding 2. The projection 56 has a height which enables the projection 56 to fill the space or gap between the base portion 51 and the door molding 2 and come into pressure contact with the door molding 2 when the base portion 51 is inserted into channel portion 4.

Accordingly, even when the gap between the door molding 2 and the base portion 51 is large as a result of a deviation in the size and configuration of the tubular sealing portion 5A and/or in the assembled configuration of the door molding 2, the projection 56 is of sufficient height and resiliency that it can completely seal that gap.

In addition, when the gap is reduced for some reason, the projection 56 can deform to match the size and configuration of that decreased space. Therefore, the projection 56 does not obstruct the assembly of the tubular sealing portion 5A to the channel portion 4 but effectively seals any gap therebetween.

Moreover, because the projection 56 is deformable, which enables the projection 56 to come into close contact with the inner surface of the door molding 2 and, accordingly, the tubular sealing portion 5A can be stably assembled, the sealing properties of the tubular sealing portion 5A are improved. Therefore, rain water and/or wash water can be completely prevented from leaking into the interior of the motor vehicle.

FIG. 3 illustrates a second embodiment of the present invention. In accordance with the second embodiment, the door molding 2 is provided with a concave portion 21 in its inside surface which extends from its corner portion along a portion of its vertically extending side wall. The sponge rubber projection 56 is formed to cover an outside corner portion of the base portion 51 of the tubular sealing portion 5A. The projection 56 is inserted into the concave portion 21 and comes into pressing contact with a surface thereof.

In the second embodiment, rather than a trim portion 5B, a leg portion 5C extends downwardly from the base portion 51 of the tubular sealing portion 5A. A heel portion 57 of the leg portion 5C is retained by a C-shaped retainer 12, which is secured to the flange 11 of the door frame 1. A garnish 7 is attached to the flange 11 so as to cover the inside surface thereof. The remainder of the structure of the second embodiment is substantially identical to that of the first embodiment. The structure of the second embodiment exhibits structural and functional advantages similar to those of the first embodiment.

Figure 5:
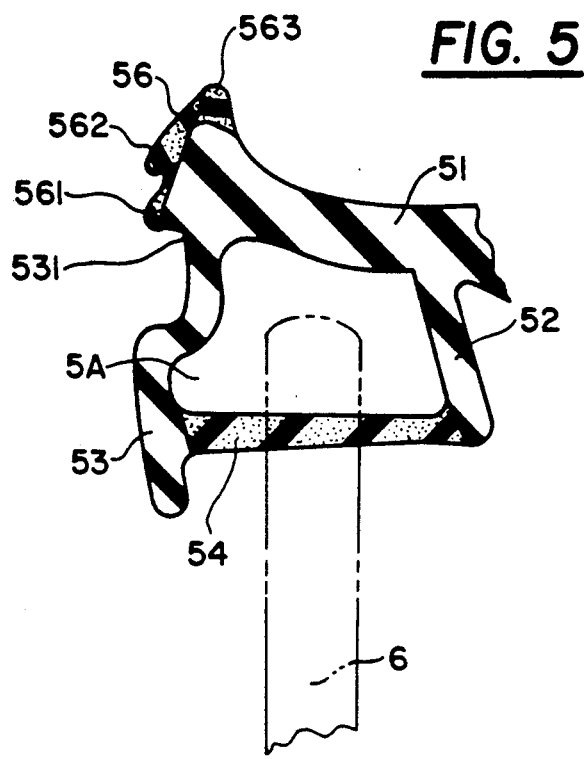
FIG. 5 is an enlarged cross-section of the outside corner portion of the base of the glass run of FIG. 4.
Figure 6:
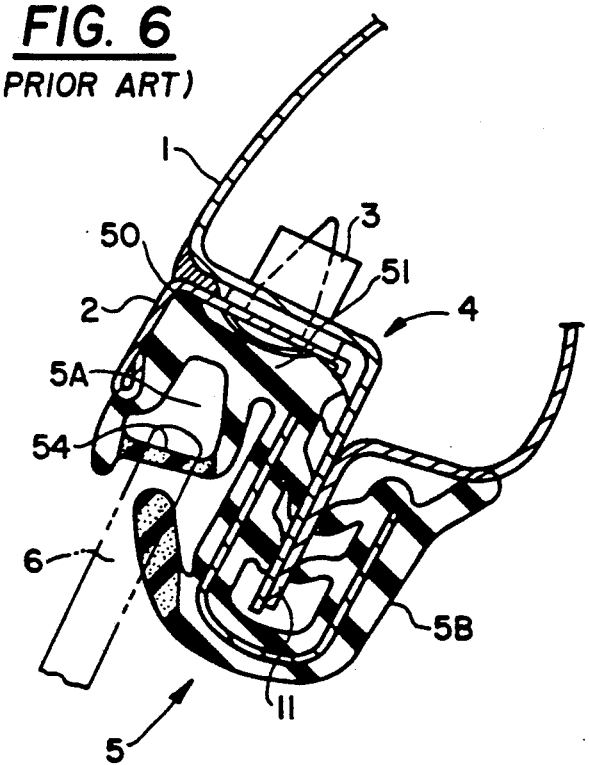
FIG. 6 is a cross-sectional view of a conventional glass run.

FIGS. 4 and 5 illustrate a third embodiment of the present invention. In accordance with the third embodiment, the sponge rubber projection 56 is formed so as to cover the outside corner portion of the base portion 51 of the tubular sealing portion 5A. The projection 56 has three small projecting elements 561, 562, 563, which respectively project outwardly from the outer surface of the projection 56. These small projecting elements 561, 562, 563 come into pressing contact with the inner surface of the door molding 2. Because a plurality of small projecting elements are provided, the seal between the glass run and the door molding is further improved. The remainder of the structure of the third embodiment is substantially identical to that of the first embodiment and exhibits similar advantages.

While the invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. An assembly for a motor vehicle having a door glass comprising:
   a door frame member having a surface which faces an upper free edge of the door glass;
   a door molding element secured to said surface of said door frame and defining therewith a channel portion having a U-shaped cross-section;
   a glass run having a U-shaped base portion formed from solid rubber, said base portion being inserted into said channel portion; and
   a projection formed from sponge rubber and disposed on an outer surface of said base portion, on an outer portion thereof with respect t a passenger compartment of the motor vehicle, said projection coming into pressing contact with an inner surface of said channel portion when said base portion is inserted into said channel portion.

2. The assembly according to claim 1, wherein said door molding is secured to said door frame by screws at about a widthwise center of a bottom surface of said channel portion.

3. The assembly according to claim 1, wherein said glass run includes a tubular sealing portion defined by said U-shaped base portion and a sponge rubber seal wall which closes an open end of said base portion and is pushed up by the peripheral edge of said door glass when said door glass is raised to a closed position thereof.

4. The assembly according to claim 3, wherein said projection is formed on an outside corner portion of said base portion with respect to the passenger compartment, and comes into pressing contact with an inner surface of an outside corner portion of said channel portion with respect to the passenger compartment.

5. The assembly according to claim 4, wherein said projection has a plurality of projecting elements defined on an outer surface thereof, said projecting elements coming into pressing contact with said inner surface of said channel portion.

6. The assembly according to claim 3, wherein said projection has a plurality of projecting elements defined on an outer surface thereof, said projecting elements coming into pressing contact with said inner surface of said channel portion.

7. The assembly of claim 6, wherein there are three projecting elements.

* * * * *